United States Patent

Heurich

[11] Patent Number: 4,474,562
[45] Date of Patent: Oct. 2, 1984

[54] TENSIONER FOR MOTOR-VEHICLE TIMING BELT

[75] Inventor: Günther Heurich, Schweinfurt, Fed. Rep. of Germany

[73] Assignee: FAG Kugelfischer Georg Schäfer & Co., Scheinfurt, Fed. Rep. of Germany

[21] Appl. No.: 324,540

[22] Filed: Nov. 24, 1981

[30] Foreign Application Priority Data

Dec. 3, 1980 [DE] Fed. Rep. of Germany ... 8032121[U]

[51] Int. Cl.³ .......................... F16H 7/12; B21K 1/40; B21D 31/00
[52] U.S. Cl. .................................... 474/133; 474/199; 474/113; 29/517; 29/520; 29/159.3
[58] Field of Search ....................... 474/133, 199, 113; 308/190, 199; 74/449; 29/159.2, 159.3, 520, 517

[56] References Cited

U.S. PATENT DOCUMENTS

| 1,206,889 | 12/1916 | Murray | 29/159.3 |
| 2,948,055 | 8/1960 | Baxter et al. | 29/159.3 |
| 2,960,893 | 11/1960 | Ocenasek | 77/55 |
| 3,071,980 | 1/1963 | Brewer | 474/133 |
| 3,318,169 | 5/1967 | Tronslien | 29/520 |
| 3,358,521 | 12/1967 | Browning | 474/133 |
| 3,429,033 | 2/1969 | Callaghan | 29/517 |
| 3,676,927 | 7/1972 | Maier | 29/517 |
| 3,950,046 | 4/1976 | Lubbersmeyer | 308/190 |
| 3,951,484 | 4/1976 | Bowman | 308/228 |
| 4,125,298 | 11/1978 | Heurich et al. | 29/520 |
| 4,131,032 | 12/1978 | Warland | 74/449 |
| 4,257,155 | 3/1981 | Hunter | 29/520 |

FOREIGN PATENT DOCUMENTS 2224111 11/1974 Fed. Rep. of Germany .
2839721 3/1980 Fed. Rep. of Germany .

Primary Examiner—Lawrence J. Staab
Assistant Examiner—Michael D. Bednarek
Attorney, Agent, or Firm—Karl F. Ross; Herbert Dubno

[57] ABSTRACT

A belt tensioner has an elongated support bar formed with a transversely throughgoing aperture and an annular inwardly directed lip around the aperture. A hardened metallic inner bearing race is centered on and elongated along a bearing axis and has one end extending into the aperture and formed with a circumferential radially outwardly open groove in which the lip is snugly fitted. An outer race is mounted on and coaxial with the other end of the inner race and is supported thereon by means of roller-bearing elements. The non-malleable one end of the inner race does not need to be deformed to secured it in the support bar; instead the support bar, which is normally made of malleable steel, is deformed to make the connection.

7 Claims, 2 Drawing Figures

TENSIONER FOR MOTOR-VEHICLE TIMING BELT

FIELD OF THE INVENTION

The present invention relates to a belt tensioner. More particularly this invention concerns a tensioner for a motor-vehicle timing belt.

BACKGROUND OF THE INVENTION

The toothed timing belt that is spanned over toothed pulleys on the drive and cam shafts of a motor-vehicle internal-combustion engine must be tensioned by a third element, since the radial spacing between the drive and camshaft pulleys is invariable. The belt cannot even be mounted in place unless it is long enough to fit over these two fixedly spaced pulleys. Hence a tensioner is used which is normally mounted on a bar formed at one end with a circular throughgoing hole and at its opposite end with an arcuate slot having a center of curvature at the hole of the other end. A wheel carried on a bearing is provided midway between these ends. A bolt passing through the circular hole acts as a pivot and a bolt passing through the arcuate slot in the other end can be tightened to lock the tensioner in any of a plurality of angularly offset positions. The wheel is pressed against the untoothed outer side of the timing belt until the proper tension is obtained, and then the bolt in the slot is tightened to secure the tensioner in place with the set degree of tension.

The timing belt moves at relatively high speed, so a high-quality roller bearing must be provided between the wheel and the axle carrying it. Such a high-quality bearing must have hardened races for the roller elements.

It has been suggested in German patent document No. 2,839,721 filed Sept. 13, 1978 by R. Polster and F. Willert to use a so-called integral inner race which functions as the inner race and axle of the bearing. This inner race is therefore constituted as a short steel pin whose one end is surface hardened to act as a race for the roller elements, and whose other end is unhardened so that it can be mounted by being spread, rivet-fashion, in a hole formed in the support bar of the tensioner.

Producing such an integral inner race, with one hardened end and an opposite unhardened end, is relatively expensive. The advantages of being able to cheaply mount the integral inner race on the support bar by spreading it like a rivet are therefore largely lost to the increased production costs entailed in hardening the outer end.

It has been suggested in German patent document No. 2,224,111 to extend the hardened inner race of a bearing and form it with an outwardly directed ridge over which a dust cap can be snap fitted. Such a structure has not been found to be adaptable to use in a timing-belt tensioner however, as it does not provide a connection rugged enough to allow the bearing itself to be mounted by means of this ridge with sufficient strength to withstand the considerable radial canting forces encountered by a belt tightener.

OBJECTS OF THE INVENTION

It is therefore an object of the present invention to provide an improved belt tightener.

Another object is the provision of such a belt tightener which overcomes the above-given disadvantages.

A further object is to provide a tightener for a motor-vehicle timing belt which can be produced at low cost and which will have a long service life.

SUMMARY OF THE INVENTION

These objects are attained according to the instant invention in a belt tensioner having an elongated support bar formed with a transversely through going aperture and an annular inwardly directed lip around the aperture and a hardened metallic inner bearing race centered on and elongated along a bearing axis and having one end extending into the aperture and formed with a circumferential radially outwardly open groove in which the lip is snugly fitted. An outer race is mounted on and coaxial with the other end of this support bar and is supported thereon by means of roller-bearing elements.

Thus the system according to this invention can be produced at low cost. The nonmalleable one end of the inner race does not need to be deformed to secure it in the support bar; instead the support bar, which is normally made of malleable steel, is deformed to make the connection.

According to another feature defined in this invention, the support bar is formed around the aperture with a cylindrical collar concentric with the aperture, having an inner end at the bar and an outer end formed with the lip, and snugly engaged around the one end. This ensures an extremely good connection of the inner race to the support bar, since these two parts engage each other over substantial cylindrical surfaces. This connection is even better when, according to another feature of the invention, the inner race is force fitted into the aperture in the collar. Such force fitting can be carried out by heating the bar and cooling the race, since such heating of the bar will not harm it in any way—as heating of the race would—whereas cooling of the race will not detemper it.

The bar according to this invention may simply be formed by stamping of sheet metal. It is therefore a relatively cheap item to produce.

The collar according to this invention has an axial length equal to at least one-fifth the axial length of the race. The inner race in turn has an axial length equal to substantially more than its outside diameter. Finally the axial length of the inner race is about twice as great as the axial length of the outer race. In a thus dimensioned system the inner race will not be able to work loose from the support bar.

The inner race itself, according to another inventive feature, is tubular and of hardened steel. The roller elements are balls.

In standard fashion the bar has one end formed with a generally circular throughgoing hole and another end with a throughgoing slot, the hole and slot flanking the aperture.

DESCRIPTION OF THE DRAWING

The above and other features and advantages will become more readily apparent from the following description, reference being made to the accompanying drawing in which.

SPECIFIC DESCRIPTION

Figure 1:
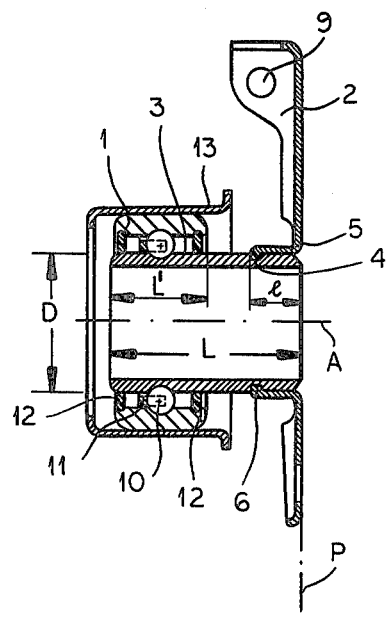
FIG. 1 is an axial and longitudinal section through the tensioner according to this invention.
Figure 2:
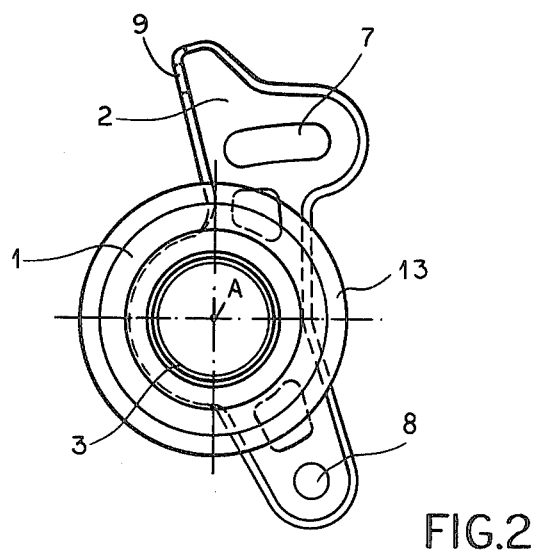
FIG. 2 is an end view of the tensioner of FIG. 1.

As seen in the drawing a timing-belt tensioner has an elongated bar 2 formed of stamped sheet steel and formed at one end with a circular throughgoing pivot hole 8 and at the other end with an arcuate slot 7 and a perpendicularly open hole 9. Normally a bolt threaded into the engine block passes through the hole 8 to serve as a pivot through the tensioner, and another bolt passing through the slot 7 can be tightened to lock the suport bar 2 in place, with a bolt passing through the hole 9 bearing against a fixed abutment and being employed to angularly move and position the bar prior to tightening of the bolt in the slot 7.

A roller bearing centered on an axis A perpendicular to the bar 2 has an outer race 1 supported by a row of balls 10 held in place by a cage 11 on an elongated tubular inner race 3. The races 1 and 3 are both of hardened steel and the race 3 has an axial length L equal to about twice the axial length L' of the outer race 1 and about twice its outside diameter D. In addition the bearing has elastomeric shields 12 and is covered by a snugly fitting cylindrical cap 13 that itself is pressed against the untoothed side of the timing belt.

The bar 2 is formed with a cylindrical collar 5 defining an aperture of the same inside diameter as the outside diameter of the tubular inner race 3. This inner race 3 is in turn formed with a radially outwardly open circumferential groove 4 in which is received an inwardly directed annular lip on the outer end of the collar 5. The collar 5 has an axial length l equal here to about one-seventh of the length L, although the length l can be at least one-fifth of the length L.

The collar and reinforcement lips around the edges of the bar 2 are formed simply by stamping. The race 3 is fitted into the collar 5 by cooling it and heating the bar 2, so as to shrink the race 3 and swell the bar 2, and the two elements are then fitted together. Once assembled the lip 6 is deformed into the groove 4 to make an extremely tight fit that is virtually integral.

The tensioner according to the instant invention can therefore be produced at relatively low cost. Once assembled in the above-described manner it is an extremely rugged assembly. The inner race 3 is so solidly mounted in the bar 2 that even the long-term large radial forces it is subjected to will not loosen it. The use of a tubular inner race 3 further makes it possible to reduce the weight of the assembly, as compared to arrangements using solid pins as inner races, so that a small weight saving is realized.

I claim:

1. A belt tensioner comprising:
    an elongated support bar of sheet metal formed with a transversely throughgoing aperture, a cylindrical collar integral with the bar and concentric with said aperture, said collar having an inner end at said bar and an outer end and an annular inwardly directed lip formed on said outer end, said collar projecting transversely to the plane of the bar;
    a one-piece hardened metallic tubular inner bearing race centered on and elongated along a bearing axis and having one end extending into said aperture and formed with a circumferential radially outwardly open groove spaced from said one end of said bar by the length of said collar, said lip being snugly fitted in said groove and said collar hugging said one end of said inner race over the entire length of said collar;
    an outer race on and coaxial with an opposite end of said inner race, said outer race being spaced from said groove along said inner race; and
    roller-bearing elements at said other end between said outer race and said inner race, said elements and said outer race defining a bearing of an axial width less than the length of said inner race whereby said one end projects beyond said bearing into said aperture in said bar, said collar having an axial length equal to at least one-fifth the axial length of said inner race.

2. The belt tensioner defined in claim 1 wherein said axial length of said inner race is equal to substantially more than its outside diameter.

3. The belt tensioner defined in claim 2 wherein said inner race is composed of hardened steel.

4. The belt tensioner defined in claim 1 wherein said axial length of said inner race is about twice as great as the axial length of said outer race.

5. The belt tensioner defined in claim 1 wherein said elements are balls.

6. The belt tensioner defined in claim 1 wherein said bar has one end formed with a generally circular throughgoing hole and another end with a throughgoing slot, said hole and slot flanking said aperture.

7. The belt tensioner defined in claim 1 wherein said one end of said inner race is force fitted into said aperture.

* * * * *